(12) United States Patent
Dorr et al.

(10) Patent No.: US 7,117,483 B2
(45) Date of Patent: Oct. 3, 2006

(54) SERVER DEBUGGING FRAMEWORK USING SCRIPTS

(75) Inventors: Robert A. Dorr, Lewisville, TX (US); Robert G. Ward, Jr., N. Richland Hills, TX (US); Keith A. Elmore, Southlake, TX (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 10/413,973

(22) Filed: Apr. 15, 2003

(65) Prior Publication Data

US 2004/0210872 A1    Oct. 21, 2004

(51) Int. Cl.
*G06F 9/45* (2006.01)
(52) U.S. Cl. ..................................... 717/124
(58) Field of Classification Search ............... 717/124, 717/125
See application file for complete search history.

(56) References Cited

U.S. PATENT DOCUMENTS

| | | | |
|---|---|---|---|
| 6,061,518 A | 5/2000 | Hoffman | |
| 6,253,368 B1 | 6/2001 | Nelin et al. | |
| 6,324,683 B1 | 11/2001 | Fuh et al. | |
| 6,353,923 B1 | 3/2002 | Bogle et al. | |
| 6,427,232 B1 | 7/2002 | Ku et al. | |
| 6,463,578 B1* | 10/2002 | Johnson | 717/124 |
| 6,470,349 B1* | 10/2002 | Heninger et al. | 707/102 |
| 6,701,514 B1* | 3/2004 | Haswell et al. | 717/115 |
| 6,708,327 B1* | 3/2004 | Aliphas | 717/125 |
| 6,718,516 B1* | 4/2004 | Claussen et al. | 715/513 |
| 2002/0174415 A1* | 11/2002 | Hines | 717/127 |

OTHER PUBLICATIONS

Joseph R. Kiniry. IDebug: An Advanced Debugging Framework for Java. Caltech Techincal Report CS-TR-98-16, Sep. 1998. 11 pages.
David N. Gray, John Hotchkiss, Seth LaForge, Andrew Shalit, and Toby Weinberg. Modern Languages and Microsoft's component object model. Communications of the ACM, vol. 41 No. 5, pp. 55-65, 1998.

* cited by examiner

*Primary Examiner*—John Chavis
(74) *Attorney, Agent, or Firm*—Amin & Turocy, LLP

(57) ABSTRACT

A debugging framework that exposes debug data in a standardized rowset format such that a relational database engine may be utilized to analyze the data. Conventional high-level scripting languages may be used to generate scripts for reuse and in extracting the debug data. An OLE-DB provider facilitates the query and analysis of debugging information through the database engine.

55 Claims, 6 Drawing Sheets

SERVER DEBUGGING FRAMEWORK USING SCRIPTS

TECHNICAL FIELD

This invention is related to software debugging, and more specifically, to using scripts to facilitate the debugging process.

BACKGROUND OF THE INVENTION

There exist today a variety of debugging tools and methods to perform diagnostics for analyzing various types of problems with server applications. However, these conventional tools are complex to use, and thus, typically only trained support professionals can implement such tools to extract data for problem resolution. Complex cases, and those involving userdumps (a userdump is a file which contains a copy of the memory used by the process at the time of the failure) need to be funneled through the support professionals or development, since only these groups had the training required to use the debugging tools.

More specifically, when a tabular data stream (TDS) connection is available and working in the server (i. e., a "live" server), queries may be performed against virtual tables or system catalog tables. To look at persistent disk pages of the server, the live database is examined, and a dump or log is loaded. Database console command (DBCC) commands (e.g., PAGE or LOG) are then used to view the disk pages or log records.

When a TDS connection is not available (i.e., the server is hung), in many cases, an attempt is made to have the customer provide a complete userdump of the server process for post-mortem analysis. In some cases, retrieval of the userdump is attempted even if the server is not fully hung to obtain the maximum amount of information possible. In other cases, it may be requested of the customer to attach with a debugger, or run the server (or another component) under the debugger with an automated script to capture particular information based on some type of sequence. This procedure is more complicated than simply getting a userdump at a known point in time.

Querying the virtual tables or utilizing DBCC commands can only work against a live server, and are performed on an ad-hoc basis. To get several snapshots, a script must be configured to "poll" for this information. Some problems associated with live process debugging include when to start running the query or diagnostic command, how long to run it, or how often to capture the right data at just the right time. Furthermore, post-mortem analysis on a userdump file is only as good as the person using the debugger or existing debugger extensions written for the server. No method exists today to look at disk pages or log records "offline" (i.e., from a backup). For other processes, components, or services, there may be virtually no diagnostic capabilities aside from using a debugger.

Many memory structures or lists within the server are not available via a virtual table. A variety of DBCC commands are available to analyze the various server memory structures. DBCC commands can provide much valuable information, but face the same limitations as the virtual tables. However, the problem with pure DBCC or the extended logging approach is that invariably something gets overlooked or a bug introduces behavior that the built-in diagnostics do not cover. Moreover, the commands may not address all members of certain structures and cannot provide the associated output as a result set. No framework exists for using these tools based upon some event that occurs within the server.

Limitations of conventional diagnostics include the following. A complete userdump may be very resource intensive. If the server is not completely hung, customers are hesitant to perform a dump, especially for machines with large amounts of physically memory. Moreover, virtual tables (sysprocesses, syslockinfo, etc.) may not provide all the information needed such that some members of the structures on which these tables are based are not included for analysis. Creating new virtual tables or expanding these tables may cause compatibility issues when changes are needed for future versions.

What is needed is a debugging architecture with reduced complexity such that frontline personnel can implement and operate the architecture for more expedient problem resolution.

SUMMARY OF THE INVENTION

The following presents a simplified summary of the invention in order to provide a basic understanding of some aspects of the invention. This summary is not an extensive overview of the invention, and is not intended to identify key/critical elements of the invention or to delineate the scope of the invention. Its sole purpose is to present some concepts of the invention in a simplified form as a prelude to the more detailed description that is presented later.

The present invention is a debugging framework having a debugging engine that interfaces to a relational database engine (e.g., a SQL (Structured Query Language) server engine) in order to utilize the power of the database. The innovative idea of using an OLE-DB (Object Linking and Embedding Data Base) rowset provider facilitates the query and analysis of debugging information through the relational database engine. This provides a very powerful framework for problem solving, and also greatly expands the set of people who may now work with the tool. The components of the framework make extensive use of COM (Component Object Model) technology to expose objects that can be executed via current scripting API's (application programmable interfaces).

The debugging engine allows the creation and use of reusable scripts developed through conventional scripting languages (e.g., VBScript or JScript). Note that the term "script" is intended to include not only a script as understood in the traditional sense, but also a .NET assembly or other similar facility. These scripts can be developed and used with the framework by personnel with very little knowledge of debugging to diagnose problem scenarios. The debugging framework facilitates the retrieval and analysis of information about the server database application and other processes contained in internal server memory structures. The framework provides all of the functionality typically found separately for querying virtual tables (i.e., sysprocesses), executing DBCC "dump" commands, and attaching a debugger to a live process or userdump file.

The disclosed debugging framework allows frontline engineers with little or no knowledge of debugging to very quickly analyze userdumps provided by customers, and view the state of the process from the userdump at the time of the failure in the same way they would view the state of a live process. This is accomplished by scripts that generate standard rowset output that matches standard in-memory tables (e.g., sysprocesses and syslocks) or tables stored on storage device (e.g., a disk or a tape). This data can be queried and analyzed using the relational database server, since the architecture has a standard rowset provider. Furthermore, some of the core components of the debugger framework provide reusable objects that may be used across other processes provided a symbol file is exposed by these components.

In addition to the use for frontline support, developers may now more quickly write scripts to expose any interesting internal data structures, instead of the old complicated process of writing debugger extensions (the scripts can be run from within the debugging tools). Since the disclosed architecture supports the use of simple scripting languages, it is accessible to more people (prior debugger extensions had to be written in the C language) and the scripts do not need be recompiled if changed, allowing for faster development. Additionally, the scripting engine allows for expedient alteration of the script with conventional text editors.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
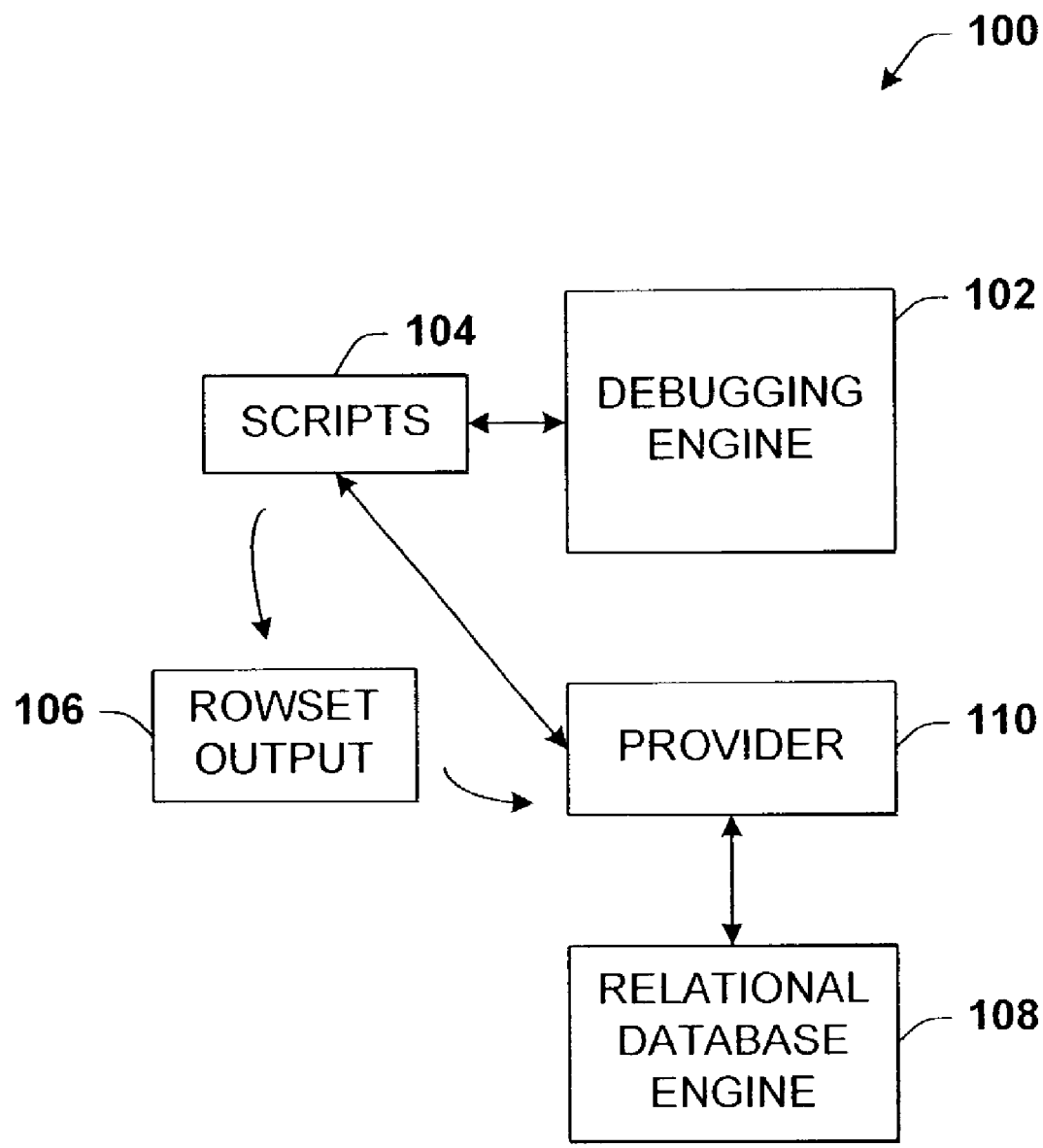
FIG. 1 illustrates a general block diagram of the debugging framework of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The disclosed debugging framework is COM-based and greatly enhances the capabilities of frontline engineers to solve complex problems without expensive additional training. (Note that COM is a component object model software architecture developed by Microsoft, Inc., which defines a structure for building program routines (or objects) that can be called up and executed in a Windows® environment. Any kind of program, small or large, can be written as a COM object, which can be run locally or remotely.) For purposes of the description herein, the terms COM object, ActiveX object, and ActiveX component, are synonymous.

More specifically, the present invention comprises a technique that allows the debugger engine, the same engine used by the WinDBG (a graphical debugger by Microsoft, Inc., for debugging both user-mode and kernel-mode code) and CDB (a console program by Microsoft, Inc., for debugging user-mode applications and drivers) user mode extension executables, to be driven from an ActiveX scripting engine to produce the standardized rowset output. Providing the standardized rowset output exposes the rowset data to a wider array of tools that may be used by higher-level users to analyze, diagnose, and resolve problems. Moreover, the query processor of the database engine may be used to interrogate the resulting rowsets. The debugging framework may be used for 32-bit and 64-bit debugging, and is extensible to higher bit architectures.

The debugging framework is not intrusive to the operation of server so that the capture of diagnostic information can be triggered based on events that occur with the server. For example, a diagnostic script may be configured to trigger when a deadlock occurs. Conditions for these events may include, e.g., only firing after n times, only firing when a certain event value meets some limit, such as fire when a lock has been held for one minute, and so on. Moreover, the diagnostic capability of the framework extends to include analyzing disk pages and/or log records, including backups, and essentially any data source to which symbol support allows access.

The COM object for the debugging engine can work with a symbol file on a live server or a process dump file. A symbol server may also be accessed that contains symbol files for various operating environments. When set to the symbol path of the symbol server, the debugger will download symbols as needed during the debugging session. Since it is COM object-based, VBScript or other appropriate scripting languages may be used to drive the debugger. This allows scripts to be developed that produce any type of data output, which further supports creation of a one-time script that performs the same function, and is reusable. Thus the debugger engine COM object consumes raw symbol information as well as raw input data from a user mode process dump file or a live server. The debugging framework functions against any executable that uses full symbols. For external use, symbols and scripts may be compressed and encrypted.

Referring now to FIG. 1, there is illustrated a general block diagram of the debugging framework 100 of the present invention. A central component of the debugging framework 100 is a debugging engine 102. The debugging engine is run on a process and the resulting debug data is stored. The debugging engine 102 interfaces with a scripts component 104 that is the source for scripts developed for driving the debugging engine 102. The scripts are generated by the frontline personnel and developers to facilitate diagnosis of server problems, and may include a large number and a variety of scripts to expose internal data structures in live processes and to analyze userdumps offline as provided by customers.

The debugging framework 100 also includes a provider 110 that interfaces with the scripts component 104 to provide control thereof for invoking a script. The script is executed against the debugging engine 102, and ultimately the resulting debug data to generate a standardized form of rowset data 106 at the script component 104. The output rowset data 106 is then exposed to a relational database engine 108 via the provider 110, allowing the user to leverage the full power of a query processor of the database engine 108 to analyze the problem though the rowset data 106. Note that the relational database engine 108 may be employed by the debugging engine 102, or the debugging engine may be employed by the relational database engine.

Figure 2:
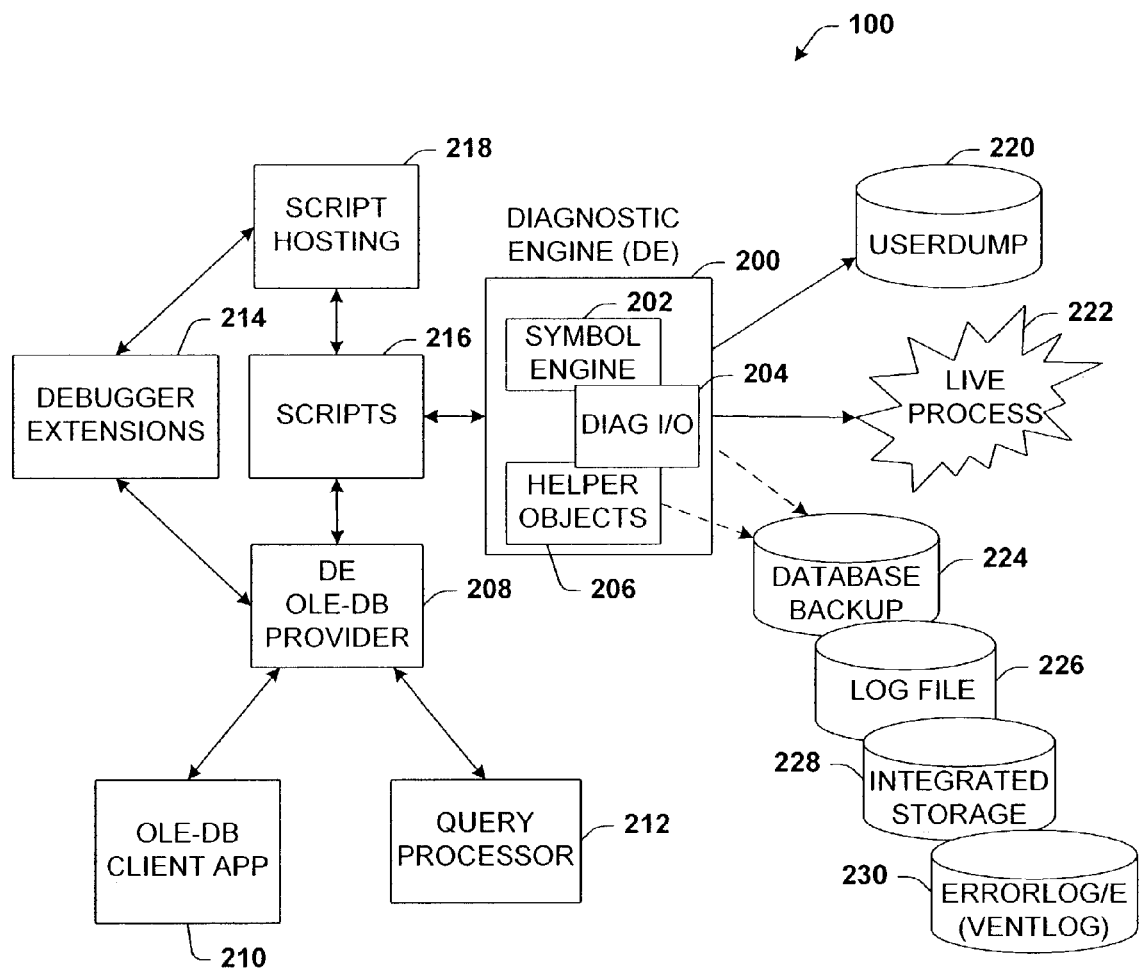
FIG. 2 illustrates a more detailed block diagram of the debugging architecture of the present invention.

Referring now to FIG. 2, there is illustrated a more detailed block diagram of the debugging architecture 100 of the present invention. The debugging architecture 100 is a collection of COM objects and scripting hosts that provide the functionality to analyze memory structure data from a live process and/or data stored in a particular format in a disk file (i.e., a userdump).

At the core of the debugging architecture 100 is a diagnostic engine 200. The diagnostic engine 200 comprises at least a symbol engine 202, a diagnostic I/O (Input/Output) component 204, and a helper objects component 206. The symbol engine 202 is effectively a COM object that exposes specific information about variables, classes, structures, and their members including types, sizes, and data. The symbol engine object 202 is generic in nature so that it may be used with any component that ships a symbol file. This provides a huge benefit for components that typically do not expose much diagnostic data. The cost is that the consuming component of this object output must know internal details about the data, including variable names, structure and class names, and their members. The user must know to traverse specific linked lists as stored in the diagnostic data. This type of design also makes for potentially big scripts, as symbol engine interfaces must be used to find out information about structures, members, etc., to produce the desired output (for example to traverse an array, size data must be known in order to know how to "walk the array"). One requirement for the symbol engine 202 is that it provides a symbol file that matches up with the source of the data (i.e., a symbol file that matches the process version from a userdump file).

The diagnostic engine 200 also includes the diagnostic I/O object 204, which is a collection of objects designed to read (and possibly write) to various "sources" of diagnostic data, including a userdump file or memory from a live process. The diagnostic I/O object 204 extends the debugging framework 100 so that other sources of information that need to be diagnosed, such as database files, database backups, log files, log backups, integrated storage files, error logs, and event logs, can be added. Thus the diagnostic engine 200 is the complete interface for diagnosis of all of these sources of diagnostic information.

The diagnostic engine 200 also includes the helper objects component 206. Since the core of diagnostic engine 200 is the symbol engine 202, which moves the complexity of capturing diagnostic data specific to the server or some other component into the scripts that consume the symbol engine 202, this could lead in some cases to very complex and large scripts to produce the needed diagnostic data. Therefore, the diagnostic engine 200 may also contain a collection of the Helper objects that include specific information of the data that will be exposed. This information could be used in two different ways. The helper component 206 may consume the output of the symbol engine 202 to provide a higher-level layer for the script writer. For example, the helper component 206 could be created specifically for a UMS component (not shown). The script writer would then use specific objects and methods provided for the UMS component instead of having to know what the actual structure, class, and variable names are within the UMS component.

The helper component 206 could also directly consume a source of data (perhaps still using the diagnostic I/O object 204 for that data so that the symbol engine 202 could consume that data as well). For example, the helper component 206 could expose the internals of a transaction log file or backup. A symbol file would not be needed in this case.

Additionally, the helper objects component 206 produces debugging data that is not normally associated with a variable. This includes thread stacks, registers, thread environment block, process information, handles, and heaps. The largest downside to any helper object 206 is that it is only as good as what it produces. The same type of issues could occur that arise with virtual tables today (e.g., "You forgot to include a column I really need").

The debugging framework 100 is extensible and flexible for use in all different types of diagnostic scenarios, since it is COM-based. This allows components that consume the output of the diagnostic engine 200 to use current scripting languages such as VBScript to produce diagnostic data. This further allows anyone with the basic knowledge of using a scripting language to consume any diagnostic information about the server application or another process without being limited to features installed with the product. Thus if a column does not exist in the virtual table (e.g., sysprocesses), a user could simply write a VBScript to obtain any information about the memory structures used to produce the table. With such a debugging framework implementation, it becomes easy for the vendor to provide some base scripts that are shipped with the product, or helper objects shipped for certain specific purposes. Furthermore, a vast array of troubleshooting scripts can be developed that may be used by customers directly, and downloaded from websites.

Not only does the debugging framework 100 utilize scripting languages as the main consumer, the information collected from the scripts can be captured in a format that is analyzed and stored in a convenient fashion. In furtherance thereof, the debugging framework 100 also includes a debugging engine OLE-DB (Object Linking and Embedding Data Base) provider 208 to produce rowsets based upon execution of scripts that consume the output of the diagnostic engine 200 directly. Thus the provider 208 exposes data from a dump file or debugged live process to the same relational database language operations as available in a runtime environment. Allowing filtering, grouping, aggregation, and other activities extends script output quickly to frontline engineers, and further extends trend and troubleshooting analysis. This further allows for diagnostic information to be collected via relational database queries (e.g., SQL (Structured Query Language)). Thus a query such as "select * from sysprocesses" may be achieved via the diagnostic engine 200, and the user is not limited to what has been produced from the virtual table as shipped by the server. This data may be exposed by either a script that consumes the symbol engine 202 or the helper object 206 developed to produce all associated data.

The capability of the provider 208 to provide standardized rowset output to the database engine precludes the need to create any new virtual tables for server applications, extend existing virtual tables, and create any special DBCC dump routines or functions. All that is needed are scripts to consume the data and the provider 208 to consume the scripts. Users may effectively run queries directly against the provider 208 using the database engine, which engine comprises an OLE-DB application 210 and a query processor 212. The query processor 212 may consume the provider 208 via a linked server query. DBCC commands are no longer required. Effectively, any DBCC command or function used to produce dump information is no longer needed.

The provider 208 not only interfaces to the client application 210 and query processor 212, but also a debugger extensions component 214 and a scripts component 216. The debugger extensions component 214 produces text-based output in the debugger front end, and allows the scripts to be run under the WinDBG and CDB debugging front ends. The scripts component 216 is a scripts repository that interfaces to the diagnostic engine 200 and a script host and controller component 218. The script component 218 loads the scripts from the scripts component 216 and interfaces with the debugging extensions component 214 to allow scripts to be run under the WinDBG and CDB front ends.

The diagnostic engine 200 is capable of accessing a userdump file 220, a live process component 222, and database backup data 224, log file data 226, integrated storage data 228, and outputs error log and extended error log information 230.

Figure 3:
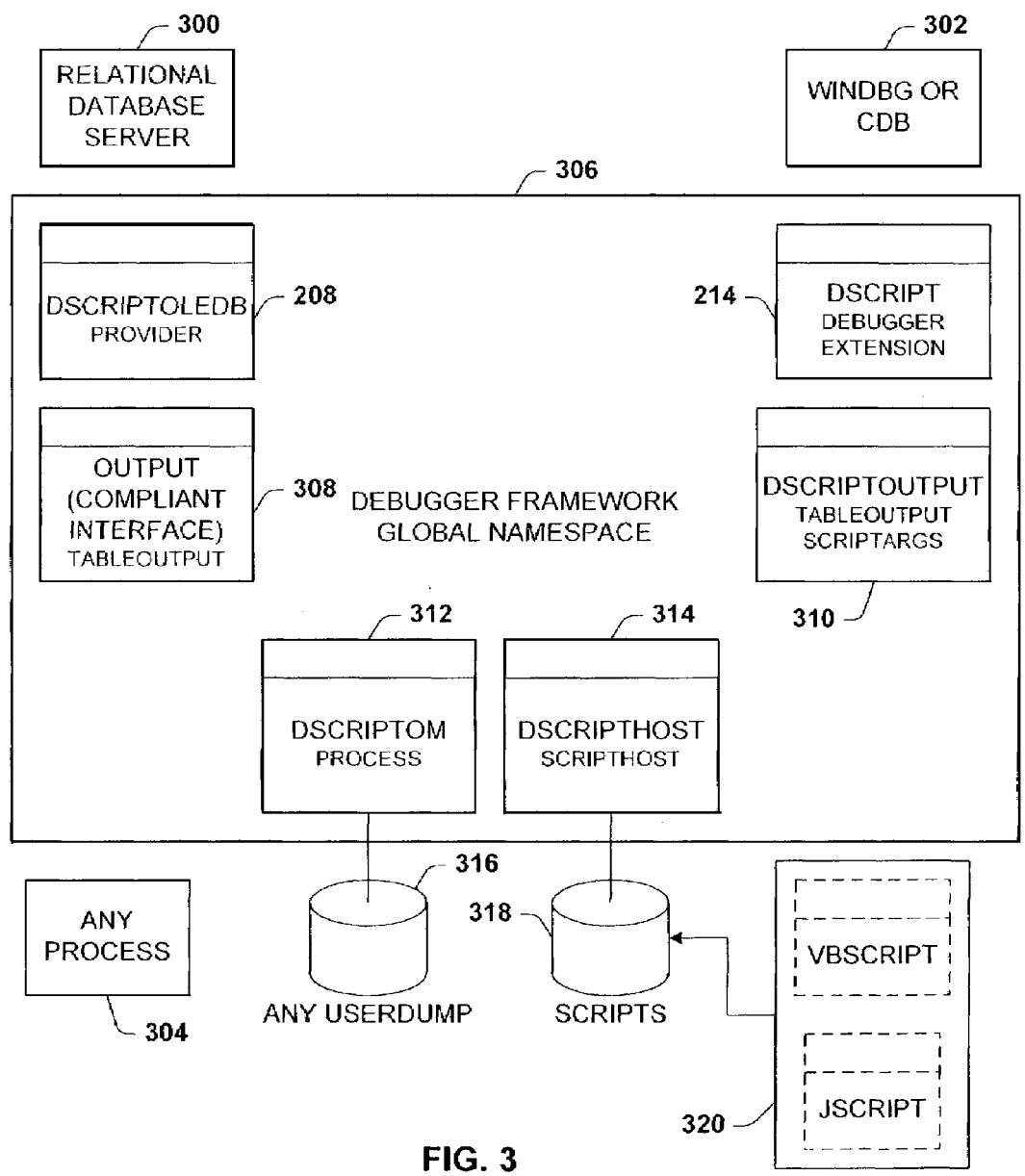
FIG. 3 illustrates a component diagram relative to the debugging framework namespace.

Referring now to FIG. 3, there is illustrated a component diagram relative to the debugging framework namespace. For purposes of discussion, the components include a relational database server 300 (which comprises the OLE-DB client app 210 and query processor 212 of FIG. 2), a user-mode extension front end debugger component 302, a process block 304 representing any process that may be running, and a global namespace 306 of the debugging framework. Additional components of the global namespace 306 are the OLE-DB provider 208 (also denoted as DScriptOLEDB) and debugger extension 214 (also denoted as DScript). The debugging framework leverages the distributed query capabilities of the database server 300 to connect to the OLE-DB provider 208. As indicated earlier, the debugger front ends may include, for example, WinDBG or CDB. The DScript debugger extension 214 is a simplistic user-mode extension exposing the debugging framework object behavior when using the debugger front ends, and allows scripts written for the disclosed debugging framework to be used with these debugger front ends.

The DScript debugger extension allows scripts to be run under the debugging front ends (e.g, WinDBG and CDB). This user mode extension is provided to execute scripts while the debugger engine is already running. This is a simple debugger extension that loads the DScriptHost component 314 and produces text-based output in the debugger front end. It exposes the same result sets to the debugger front ends as is produced by the provider 208. This extension allows a much greater audience to access to the power of debugger extensions, as many more people are now able to write scripts using script programs, e.g., VBScript and Jscript, as opposed to the C language. In addition, scripts are interpreted; so do not require recompiling when changed. This allows for much more rapid development of debugger scripts.

When using the DScriptOLEDB provider 208, the OLE-DB provider 208 initializes and controls the debugger engine. Similarly, when utilizing the user-mode applications, e.g., WinDBG or CDB, the debugger engine is initialized and controlled by these applications.

Since each script outputs a single result set, a number of troubleshooting prospects can now be used. To facilitate this, an Output interface 308 is provided. The Output interface 308 is set based, and enables the DScriptOLEDB provider 208 to consume the output from the scripts. All scripts must use the Output model 308 in order for the full power of the framework to be available. There are two implementations of the Output model interface 308. One is provided for simple text-based output when running under the user-mode extension of the debugger front end (e.g., WinDBG or CDB). Another is exposed by the DScriptOLEDB provider 208 to allow exposing the output as an OLE-DB rowset that is consumable by a linked query operation. The output objects (i.e., DScriptOutput 310 and the OLE-DB provider 208) expect the row data to be produced in the same order as the columns were written, and will produce rows as it follows the columns being added. Thus the output object allows columnar data, no row data, or at least one row of data. This reduces the complexity of the output objects while keeping a generic methodology associated with the scripts. Both output objects are capable of accepting data in strings.

The Output interface 308 exposes the following methods and properties: a method to define metadata for the result set; a get or set property for letting the script know if metadata should be returned; a get or set property for letting the script know if row data should be returned; a method to output column data; a method allowing alternate dispatch interfaces for output to be engaged; a method to clear any remaining output for the current row; a method allowing for special formatting of numeric values; and a method for allowing special output that is not considered part of the row data.

It is important that the script facilitates the return of metadata and/or row data, since the query processor requests metadata only when normalizing the query, and the execution engine may request metadata and/or row data to complete the query. The script may be called multiple times and request any combination of data, i.e., metadata, row data, or metadata and row data. Thus the script is capable of producing metadata and row data as separate operations.

The DScriptOLEDB provider 208 is an OLE-DB provider that exposes an OLE-DB rowset interface that can be consumed by the server distributed query processor. For each available script that supports the DScriptOM 312, the provider 208 can produce a rowset (or several different rowsets, if the script supports arguments), which can be viewed as a table in the server 300. Rowsets can be queried directly or copied into server tables to allow for faster repeated access. The provider 208 exposes the debugging output to the server 300, and therefore, allows leveraging the full power of the server query processor to analyze the problem. For example, the output can be quickly filtered using selections (e.g., using a WHERE clause), perform joins of multiple tables to provide a more complete picture, etc.

The DScriptOLEDB provider 208 instantiates the debugger engine client and executes the commands as if in CDB or WinDBG. The debugger engine is already initialized and controlled by WinDBG or CDB. However, when using the OLE-DB provider 208, the provider 208 initializes and controls the debugger engine. The provider 208 is a level one, read-only, forward-only provider to expose the results of the ActiveX script as a rowset to the server 300. One component of the provider 208 is a sandbox, which deals with and protects the debugger engine. The sandbox may be a single thread used to support serialization of the debugger engine client. The debugger engine is executed on the same thread that created it, and a single debug operation occurs at a time. However, in more robust implementation, the sandbox may include multiple threads such that the debugging engine may perform multiple debug operations at a time. The sandbox thread is not created until an actual request (e.g., OpenQuery) for metadata or row data is received by the provider 208. The sandbox creates the debugger engine client, and loads the appropriate dump file and symbols. The debugger client (or session) remains active for the lifetime of the sandbox thread. If the sandbox is single threaded, it prevents multiple debugger requests from running at the same time. The sandbox can also cache the debug session. The sandbox ends the current debug session and starts a new session in response to a change of path for either the dump file or symbols. Sandbox queries include joins, unions, and limitations, and also supports fibers.

In operation, there are four additional objects pushed into the global namespace 306 before a script is executed. These objects are labeled accordingly as the Output component 308, a DScript Output Model component 310 (also denoted as DScriptOutput), a scriptable object model component 312 (also denoted as DScriptOM), and an ActiveX script host site and controller 314 (also denoted as DScriptHost).

The core debugging engine includes the debugging APIs (application program interfaces) that are used to provide the DScriptOM component 312 (or process object). The DScriptOM component 312 provides a scriptable COM-based object model on top of the debugging engine APIs, further provides access to the debugger engine to retrieve data values, and is exposed to the scripts as the "Process" object.

The Output object 308 provides the compliant interface that is the same output interface exposed by the DScriptOLEDB provider 208 as TableOutput. The Output object 308 handles a row and column text display when run under the debuggers. The Output object 308 of the DScriptOLEDB provider 208 exposes the data as an OLE-DB rowset.

The DScriptOutput component 310 provides the standardized argument and output objects, exposed respectively as ScriptArgs and TableOutput, which enable combining the debugging engine with the server query processor. When the data is exposed to the query processor, it opens the doors to numerous troubleshooting techniques that were in the past generally relegated to a sophisticated user mode extension or other intricate code. The query processor already has the capability to perform sophisticated grouping, searching, aggregation, cursor support, and other avenues to process data.

The DScriptOM component 312 is a process that exposes the power of the debugger engine. It interfaces to userdump storage 316 to access userdump files for processing.

The DScriptHost component 314 interfaces to a script repository 318, loads scripting engines 320, e.g., a VBScript engine and a JScript engine, exposes the DScriptHost global object, handles the global object collection, controls Just-In-Time debugging, and allows interaction between the script engines so routines can invoke each other. The ActiveX script engines 320 are used to execute the scripts, which script files may be in Unicode or ASCII-based. The DScriptHost component 314 is automatically pushed into the global collection for use by the scripts.

When an open query or DScript run action is invoked, arguments are parsed into the ScriptArgs collection. The TableOutput object is created, and the proper destination is established. A ScriptHost object of the DScriptHost component 314 is created and the entry point script is loaded. The process object of the DScriptOM component 312 is then created and the debugger engine client interface is passed to the process object of the DScriptOM component 312. Finally, the global objects are pushed into the namespace 306, and the script is run.

There is at least two script types: an entry point script exposes the rowset, and a helper script is for supporting routines. The entry point script may provide metadata and row data code paths. Thus it is possible for the script to be called from the DScriptOLEDB provider 208, and return only metadata and/or row data. Helper scripts cannot be run as standalone, and are the supporting routines used by the entry point scripts. Entry point scripts generally contain rowset in the filing. The script as designed allows the script to include other script files. This makes it possible to centralize and reuse code as well as calling and mixing subroutines in a script language. The DScriptOLEDB provider 208 enumerates the available entry point scripts with the sp_tables_ex procedure, which is the same procedure used by the server enterprise manager to show the tables for a link server. Since the debugging engine may be configured to allow only a single debug session at a time, a complete result set must be produced from a single script before the next script can be executed. It is appreciated that in more robust implementations, multiple debug sessions may be run at a single time.

Each script contains XML (eXtensible Markup Language) tags to a help file for invoking sophisticated help information. The help file also contains numerous buttons and wizards to make many tasks point-and-click savvy. The XML help tags are actually placed in comment blocks of the actual script.

Figure 4:
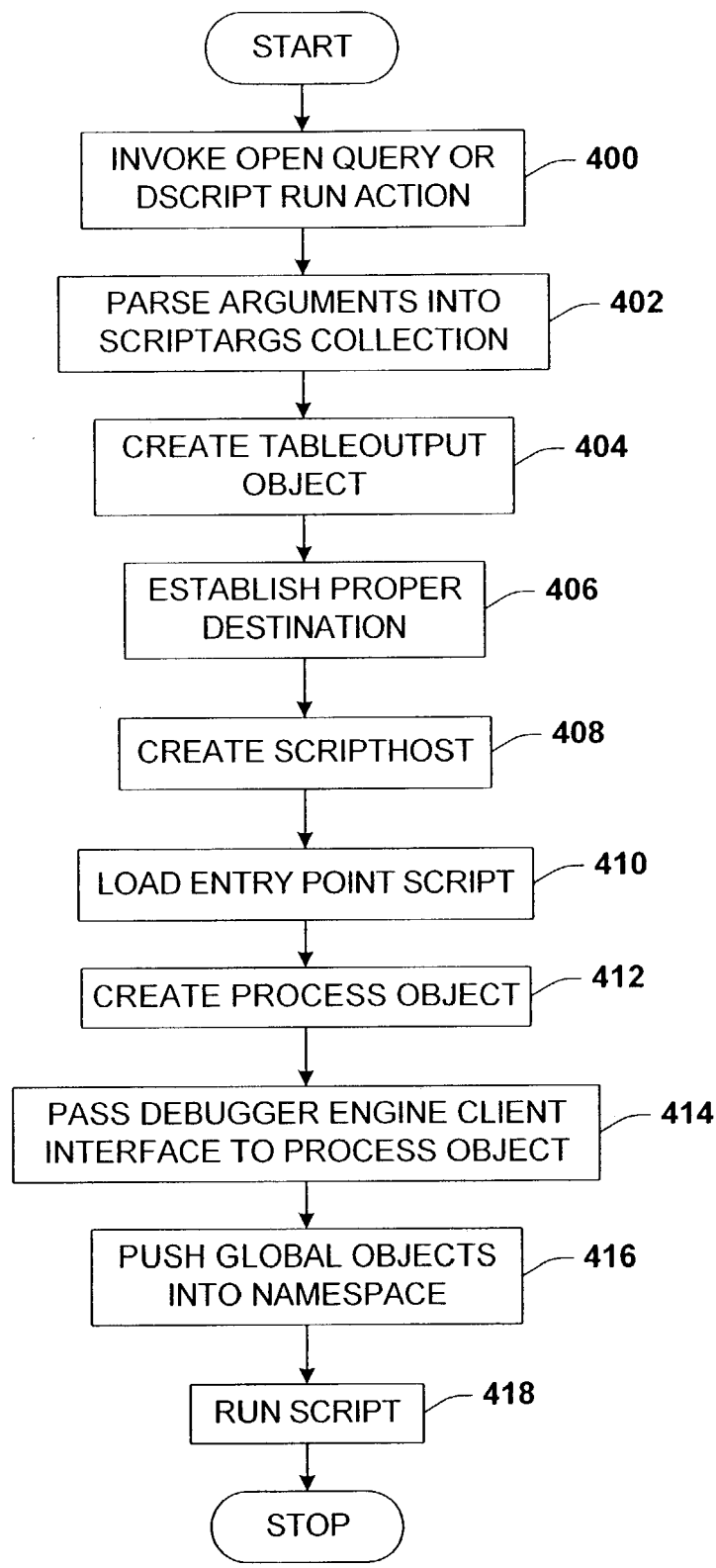
FIG. 4 illustrates a flow chart of a process of using a script.

Referring now to FIG. 4, there is illustrated a flow chart of the process of using a script. While, for purposes of simplicity of explanation, this methodology and other methodologies herein are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 400, where an open query or DScript run action is invoked. Arguments are then parsed into the ScriptArgs collection, as indicated at 402. At 404, the TableOutput object is created. At 406, the proper destination is established. The ScriptHost is then created, as indicated at 408. At 410, the entry point script is loaded. At 412, the process object is then created, and the debugger engine client interface is passed to the process object, as indicated at 414. Finally, at 416, the global objects are pushed into the namespace, and the script is run, as indicated 418.

Figure 5:
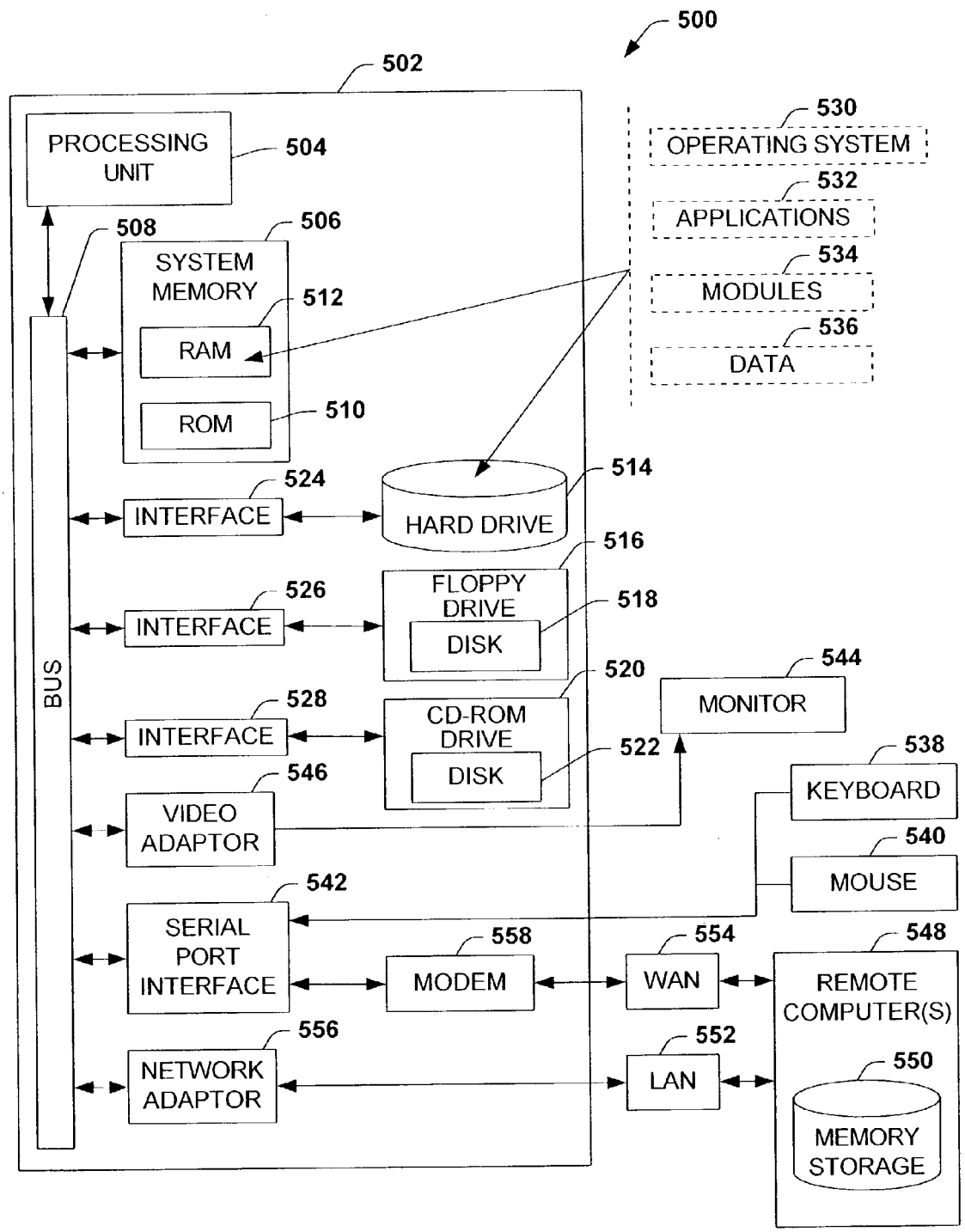
FIG. 5 illustrates a block diagram of a computer operable to execute the disclosed architecture.

Referring now to FIG. 5, there is illustrated a block diagram of a computer operable to execute the disclosed architecture. In order to provide additional context for various aspects of the present invention, FIG. 5 and the following discussion are intended to provide a brief, general description of a suitable computing environment 500 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 5, there is illustrated an exemplary environment 500 for implementing various aspects of the invention includes a computer 502, the computer 502 including a processing unit 504, a system memory 506 and a system bus 508. The system bus 508 couples system components including, but not limited to the system memory 506 to the processing unit 504. The processing unit 504 may be any of various commercially available processors. Dual microprocessors and other multiprocessor architectures also can be employed as the processing unit 504.

The system bus 508 can be any of several types of bus structure including a memory bus or memory controller, a peripheral bus and a local bus using any of a variety of commercially available bus architectures. The system memory 506 includes read only memory (ROM) 510 and random access memory (RAM) 512. A basic input/output system (BIOS), containing the basic routines that help to transfer information between elements within the computer 502, such as during start-up, is stored in the ROM 510.

The computer 502 further includes a hard disk drive 514, a magnetic disk drive 516, (e.g., to read from or write to a removable disk 518) and an optical disk drive 520, (e.g., reading a CD-ROM disk 522 or to read from or write to other optical media). The hard disk drive 514, magnetic disk drive 516 and optical disk drive 520 can be connected to the system bus 508 by a hard disk drive interface 524, a magnetic disk drive interface 526 and an optical drive interface 528, respectively. The drives and their associated computer-readable media provide nonvolatile storage of data, data structures, computer-executable instructions, and so forth. For the computer 502, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 512, including an operating system 530, one or more application programs 532, other program modules 534 and program data 536. It is appreciated that the present invention can be implemented with various commercially available operating systems or combinations of operating systems.

A user can enter commands and information into the computer 502 through a keyboard 538 and a pointing device, such as a mouse 540. Other input devices (not shown) may include a microphone, an IR remote control, a joystick, a game pad, a satellite dish, a scanner, or the like. These and other input devices are often connected to the processing unit 504 through a serial port interface 542 that is coupled to the system bus 508, but may be connected by other interfaces, such as a parallel port, a game port, a universal serial bus ("USB"), an IR interface, etc. A monitor 544 or other type of display device is also connected to the system bus 508 via an interface, such as a video adapter 546. In addition to the monitor 544, a computer typically includes other peripheral output devices (not shown), such as speakers, printers etc.

The computer 502 may operate in a networked environment using logical connections to one or more remote computers, such as a remote computer(s) 548. The remote computer(s) 548 may be a workstation, a server computer, a router, a personal computer, portable computer, microprocessor-based entertainment appliance, a peer device or other common network node, and typically includes many or all of the elements described relative to the computer 502, although, for purposes of brevity, only a memory storage device 550 is illustrated. The logical connections depicted include a local area network (LAN) 552 and a wide area network (WAN) 554. Such networking environments are commonplace in offices, enterprise-wide computer networks, intranets and the Internet.

When used in a LAN networking environment, the computer 502 is connected to the local network 552 through a network interface or adapter 556. The adaptor 556 may facilitate wired or wireless communication to the LAN 552, which may also include a wireless access point disposed thereon for communicating with the wireless adaptor 556. When used in a WAN networking environment, the computer 502 typically includes a modem 558, or is connected to a communications server on the LAN, or has other means for establishing communications over the WAN 554, such as the Internet. The modem 558, which may be internal or external, is connected to the system bus 508 via the serial port interface 542. In a networked environment, program modules depicted relative to the computer 502, or portions thereof, may be stored in the remote memory storage device 550. It will be appreciated that the network connections shown are exemplary and other means of establishing a communications link between the computers may be used.

Figure 6:
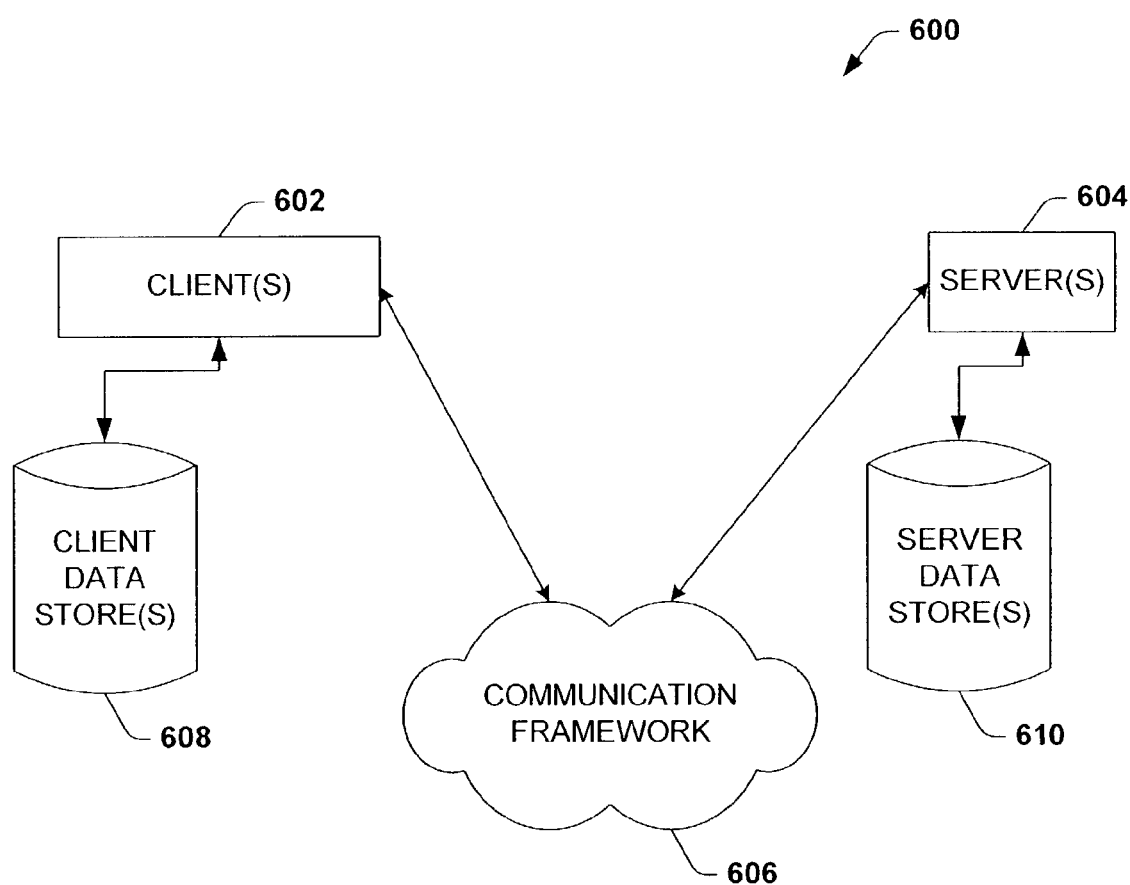
FIG. 6 illustrates a schematic block diagram of an exemplary computing environment in accordance with the present invention.

Referring now to FIG. 6, there is illustrated a schematic block diagram of an exemplary computing environment 600 in accordance with the present invention. The system 600 includes one or more client(s) 602. The client(s) 602 can be hardware and/or software (e.g., threads, processes, computing devices). The client(s) 602 can house cookie(s) and/or associated contextual information by employing the present invention, for example. The system 600 also includes one or more server(s) 604. The server(s) 604 can also be hardware and/or software (e.g., threads, processes, computing devices). The servers 604 can house threads to perform transformations by employing the present invention, for example. One possible communication between a client 602 and a server 604 may be in the form of a data packet adapted to be transmitted between two or more computer processes. The data packet may include a cookie and/or associated contextual information, for example. The system 600 includes a communication framework 606 (e.g., a global communication network such as the Internet) that can be employed to facilitate communications between the client(s) 602 and the server(s) 604. Communications may be facilitated via a wired (including optical fiber) and/or wireless technology. The client(s) 602 are operably connected to one or more client data store(s) 608 that can be employed to store information local to the client(s) 602 (e.g., cookie(s) and/or associated contextual information). Similarly, the server(s) 604 are operably connected to one or more server data store(s) 610 that can be employed to store information local to the servers 604.

Remote debugging may be facilitated between the client 602 and the server 604. This can be accomplished by developing a UNC (universal naming convention) path to the user mode dump file. The UNC is a standard for identifying servers, printers, and other resources of a network. The UNC method allows all symbols, extensions, and scripts to be loaded and executed on the local debugger client machine 602. The information retrieved from the UNC path consists of the specific memory access requests. The dump file can then be opened under WinDBG, CDB, or the OLE-DB provider to access the information using the fully qualified UNC path. The debugger provides a remote process feature that facilitates a live process debug on a customer machine using WinDBG, CDB, or the OLE-DB provider.

The debugging framework includes an interactive graphical user interface (GUI) for interaction with a user. The GUI further includes at least one wizard that facilitates the generation of a standalone website set of files and debug data that can be transmitted to a remote customer after the debug operation has been completed by a local support person on the remote customer server. The customer then need only execute a file to cause presentation of the debug data in a webpage format such that both the customer and the support person can together review the data.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A debugging system, comprising:
   a debugging engine that employs at least one reusable script for generating rowset data relating to a system operation, the rowset data mapping to tables of a relational database; and
   a relational database engine associated with the debugging engine to query and analyze the rowset data.

2. The system of claim 1, further comprising an output model that facilitates employment of the relational database engine by the debugging engine.

3. The system of claim 2, the output model outputting at least one of a text-based data and the rowset data.

4. The system of claim 2, the script utilizing the output model in order to access the relational database engine.

5. The system of claim 2, the output model outputting text-based data when running under a user mode extension debugger front end.

6. The system of claim 2, the output model facilitating output of the rowset data by a provider.

7. The system of claim 1, the at least one reusable script comprising a first script and a second script, the first script including at least the second script.

8. The system of claim 1, further including a script host site and controller that loads one or more script engines, the script host site and controller facilitating the capability of a first script to invoke a second script.

9. The system of claim 1, the script exposing metadata and row data.

10. The system of claim 1, the script is called one or more times.

11. The system of claim 1, the script called to request at least one of metadata, row data, and a combination of metadata and row data.

12. The system of claim 1, the script returning a single result for processing by the relational database engine.

13. The system of claim 1, further comprising an output object that allows at least one of columnar data output and row data.

14. The system of claim 1, further comprising an output object that exposes a message from the script.

15. The system of claim 1, further comprising an output object that accepts a string.

16. The system of claim 1, further comprising a scriptable object model on top of the debugging engine.

17. The system of claim 16, the scriptable object model is COM based.

18. The system of claim 1, further comprising a scripting engine for executing the script.

19. The system of claim 1 operable to process at least one of live process data and userdump data.

20. The system of claim 1, further comprising at least one of a provider component and a script component to output the rowset data.

21. The system of claim 20, the provider component is an OLE database provider.

22. The system of claim 1, the relational database engine is a structured query language engine.

23. The system of claim 1, further comprising a provider that produces at least one of rowset data and metadata that can be viewed as a table in the relational database.

24. The system of claim 1, the script supporting arguments.

25. The system of claim 1, the script producing metadata and row data as separate operations.

26. The system of claim 1, the script including help tags associated with help information.

27. The system of claim 1, the help tags are XML help tags.

28. The system of claim 1, the debugging engine running at least one debug session at a time.

29. The system of claim 1, the script run against the debugging engine that is at least one of local and remote from the relational database engine.

30. The system of claim 1, the debugging engine supporting at least one of just-in-time debugging, a script, and .NET assemblies.

31. A network server according to the system of claim 1.

32. The system of claim 1, further including a graphical user interface (GUI) for interacting with the debugging system, the GUI further including a wizard for generating a webpage for displaying the rowset data over a global communication network.

33. A debugging system, comprising:
   means for finding errors in a system operation by employing reusable scripts for generating rowset data relating to the system operation, the rowset data mapping to tables of a relational database; and
   means for querying and analyzing the rowset data.

34. A method of debugging a system operation, comprising:
   generating rowset data with a debugging engine, the debugging engine executing a script to obtain the rowset data, which rowset data maps to tables of a relational database; and
   processing the rowset data with a relational database engine associated with the debugging engine.

35. The method of claim 34, further comprising an output model that facilitates employment of the relational database engine by the debugging engine.

36. The method of claim 34, further comprising an output model that outputs at least one of a text-based data and the rowset data.

37. The method of claim 34, further comprising a script host site and controller that loads one or more script engines, the script host site and controller facilitating the capability of a first script to invoke a second script.

38. The method of claim 34, the script is called multiple times and each time exposes either metadata or row data.

39. The method of claim 34, further comprising a provider that produces at least one rowset that can be viewed as a table in the relational database.

40. The method of claim 34, the script supporting arguments.

41. A method of debugging a system operation, comprising:
   receiving a script;
   invoking an open query against memory tables of the system operation;
   processing the script with a debugging engine in response to the open query;
   generating rowset data with the debugging engine;
   exposing the rowset data to a relational database engine via an OLE provider; and
   processing the rowset data with the relational database engine.

42. The method claim 41, further comprising providing an output model to facilitate outputting at least one of a text-based data when running under a debugger front end and the rowset data when running under the OLE provider.

43. The method claim 41, the script including at least the second script.

44. The method claim 41, further providing a script host site and controller that loads one or more script engines, the script host site and controller facilitating the capability of the script to invoke a second script.

45. The method of claim 41, the script is called multiple times and each time exposes either metadata or row data.

46. The method of claim 41, the script called to request at least one of metadata, row data, and a combination of metadata and row data.

47. The method of claim 41, further comprising an output object that exposes a message from the script.

48. The method of claim 41 operable to process the rowset data of at least one of live process data and userdump data.

49. The method of claim 41, the relational database engine is a structured query language engine.

50. The method of claim 41, the script supporting arguments.

51. The method of claim 41, the script including XML help tags associated with help information.

52. The method of claim 41, the script is an entry point script that exposes the rowset data.

53. The method of claim 52, the entry point script further includes a help script.

54. The method of claim 41, the script run against a remote debugging engine disposed on a remote network, and processed on a local relational database engine.

55. The method of claim 41, further comprising facilitating debugging of the system operation via a GUI, which GUI includes a wizard for generating a webpage that displays the rowset data to a remote user over a global communication network.

* * * * *